(12) United States Patent
Bethke

(10) Patent No.: US 12,325,985 B1
(45) Date of Patent: Jun. 10, 2025

(54) RAINWATER COLLECTOR

(71) Applicant: Calder Bethke, Tucson, AZ (US)

(72) Inventor: Calder Bethke, Tucson, AZ (US)

( * ) Notice: Subject to any disclaimer, the term of this patent is extended or adjusted under 35 U.S.C. 154(b) by 0 days.

(21) Appl. No.: 18/311,835

(22) Filed: May 3, 2023

(51) Int. Cl.
*E03B 3/02* (2006.01)

(52) U.S. Cl.
CPC ..................... *E03B 3/02* (2013.01)

(58) Field of Classification Search
CPC ......... E03B 2001/047; E03B 1/04; E03B 3/02
See application file for complete search history.

(56) References Cited

U.S. PATENT DOCUMENTS

2015/0021247 A1* 1/2015 Lin-Hendel .............. C02F 1/00
   210/170.03
2017/0332564 A1* 11/2017 Wales ...................... E03B 1/04
2021/0301550 A1*  9/2021 Volin ...................... E04H 15/28

* cited by examiner

*Primary Examiner* — P. Macade Nichols
(74) *Attorney, Agent, or Firm* — University of Arizona IP Clinic

(57) ABSTRACT

A mobile device, system, and method for collecting rainwater. The device includes at least one structural support, a rainwater-catching or collection surface, one or more fixtures attached to the surface, and a housing. The surface may be made from one or more materials such as a fabric that is at least water-resistant enough to catch at least 50% of the rainwater. The surface also should have at least a portion that is flexible, such that the fixtures can form a gutter on the collection surface when the fixtures are in a closed configuration. The housing is large enough to enclose the collection surface, thus making the device easy to keep clean, transport and deploy at different locations.

11 Claims, 14 Drawing Sheets

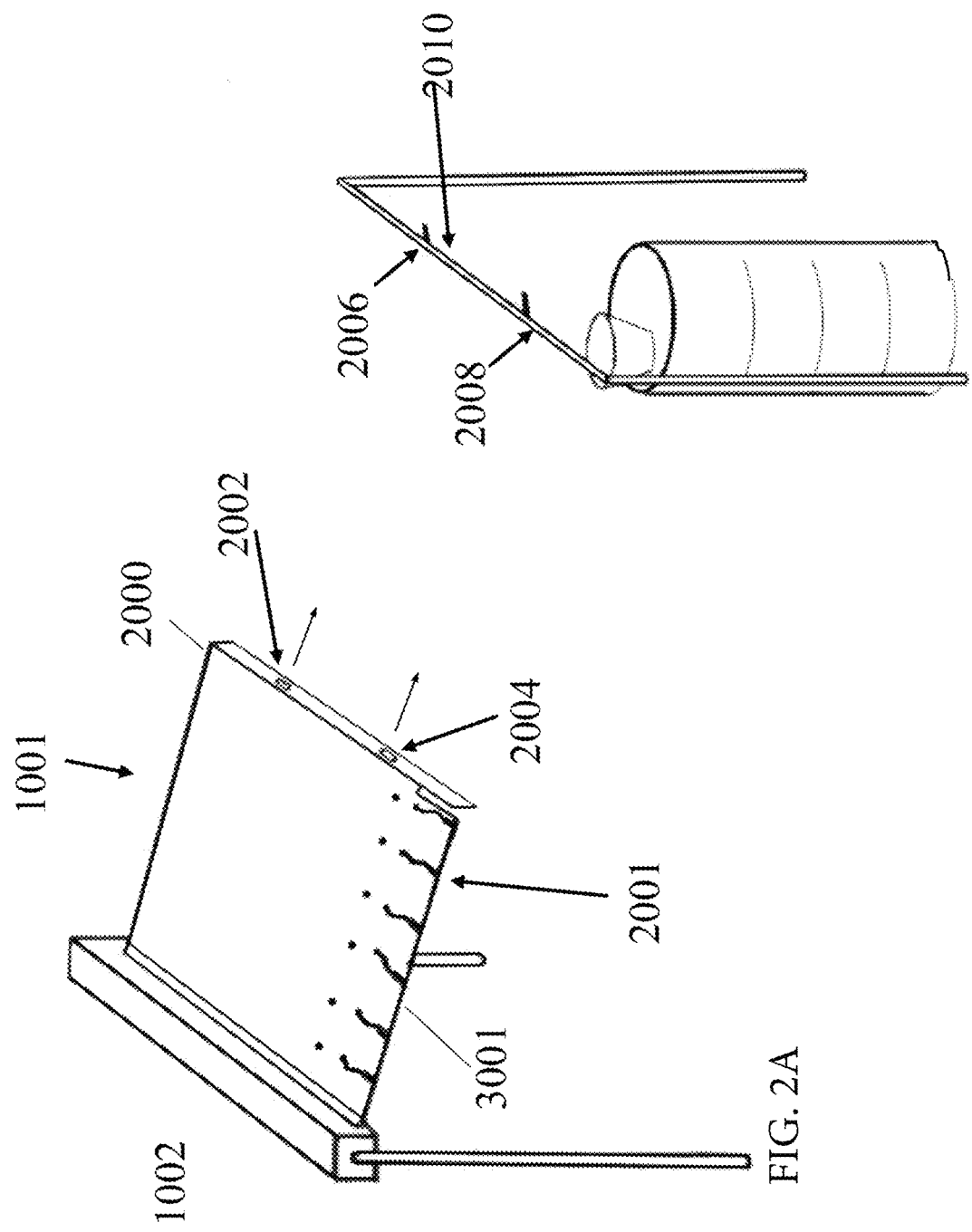

RAINWATER COLLECTOR

BACKGROUND

1. Field of the Invention

The present disclosure relates to harvesting rainwater, and more particularly to a flexible and mobile rainwater collection device.

2. Background

Water is a valuable resource that supports countless lives. However, water scarcity is growing as time progresses. To fully use clean water, people have collected rainwater. A typical rainwater collection involves guiding the rainwater to a storage reservoir.

One way to collect rainfall is to install a rainwater collection system on the roof of a housing structure. This type of system is installed on a roof with gutters at the edge of the roof to collect the rainfall. However, the entire system requires installation that is both slow and costly. It must also be on a structure with a roof that has some slope. Moreover, roofs and permanent structures get polluted with bird dropping and other contaminants, including with pollutants from emissions, which then contaminate the rainwater.

A more flexible way to collect rainfall is to use a wrap installed on different poles. The wrap and poles can be uninstalled but can require a lot of time and effort, for example by requiring a ladder or more than one person to setup/breakdown. The wrap and the poles create some type of slope to guide the rainfall into collection buckets. However, the downside is that the slope is solely dependent on the poles. Rainfall is often times accompanied by windy weather. The degree of the slope can be hard to maintain when the wind blows.

Embodiments disclosed herein address these problems.

SUMMARY OF THE DISCLOSURE

The present disclosure details embodiments of an inexpensive and mobile device, system, and method for collecting rainwater. Being able to close a water collection device also mitigates wear and tear from sun exposure during dry periods, as well as minimizing soiling or pollution contamination. One embodiment comprises at least one structural support, a rainwater-catching surface, one or more fixtures attached to the surface, and a housing. The surface may be made from one or more materials such as a fabric that is at least water-resistant enough to catch at least 50% of the rainwater. The surface also should have at least a portion that is flexible, such that the fixtures can form a gutter on the fabric when they close. The housing is large enough to enclose the surface.

In another embodiment, a rainwater collection reservoir is provided. Still other embodiments further comprise at least one guidance tube that can be in any shape. The surface, structural supports, and guidance tube can all have switches that can connect to each other.

In one embodiment, four structural supports are used. The housing is attached to two of the structural support on one side; on the other side, one guidance tube is attached to another structural support. The surface, e.g., a fabric sheet, is then drawn out from the housing. Then the fabric is attached to all four of the structural supports. The fixtures on the fabric are closed to form a gutter along an edge to guide the rainwater to the guidance tube. The rainwater can then be collected in a reservoir.

In one embodiment, the fixtures can be snap fasteners. One part of the snap fastener is attached to the water collection surface at least some distance from an edge. The other part of the snap fastener is attached to a narrow piece of flexible material. Then when the snap fastener set closes, the fixture forms a gutter.

In another embodiment, the fixtures can be buckle-type fastener sets. One part of the buckle fastener is attached to the collection surface at least some distance from an edge. The other part of the buckle fastener is attached to a narrow piece of flexible material. Then when the knuckle-type fastener set closes, the fixture forms a gutter.

In yet another embodiment, the fixtures can be hook and loop tapes. One part of the hook and loop tape is attached to the collection surface at least some distance from an edge. The other part of the hook and loop tape is attached to a narrow piece of flexible material. Then when the hook and loop tapes close, the fixture forms a gutter.

In still another embodiment, the fixtures can be wires. On the collection surface, at some distance from the edges, holes can be formed either on the surface by itself or by a hook that is attached to the fabric. When the wires go through the holes, the gutter forms on the edge of the surface.

In another embodiment, the gutter can be formed by railings instead of fixtures. One or more railings are attached to the housing on one side and are supported by structural supports on the other side. The railings are shaped to form the gutter when the collection surface follows the railings' shape. The collection surface can be connected to one or more strings coming from a motor-geared or spring-loaded box. When the box operates, the box creates tension through the strings to extend the collection surface.

BRIEF DESCRIPTION OF THE DRAWINGS

FIG. 2A shows a perspective view of a rainwater collection embodiment when the collection surface is partially drawn out from the housing shown in FIG. 1A.

FIG. 2B shows a perspective view of the second part of a rainwater collection embodiment set shown in FIG. 1B.

DETAILED DESCRIPTION

While the disclosure is described here with reference to several embodiments, it should be clear that the inventive subject matter should not be limited only to the embodiments disclosed or discussed. The description of the embodiments here is illustrative and should not limit the scope of the invention as disclosed or described in the claims, which encompass all equivalents.

Figure 1B:
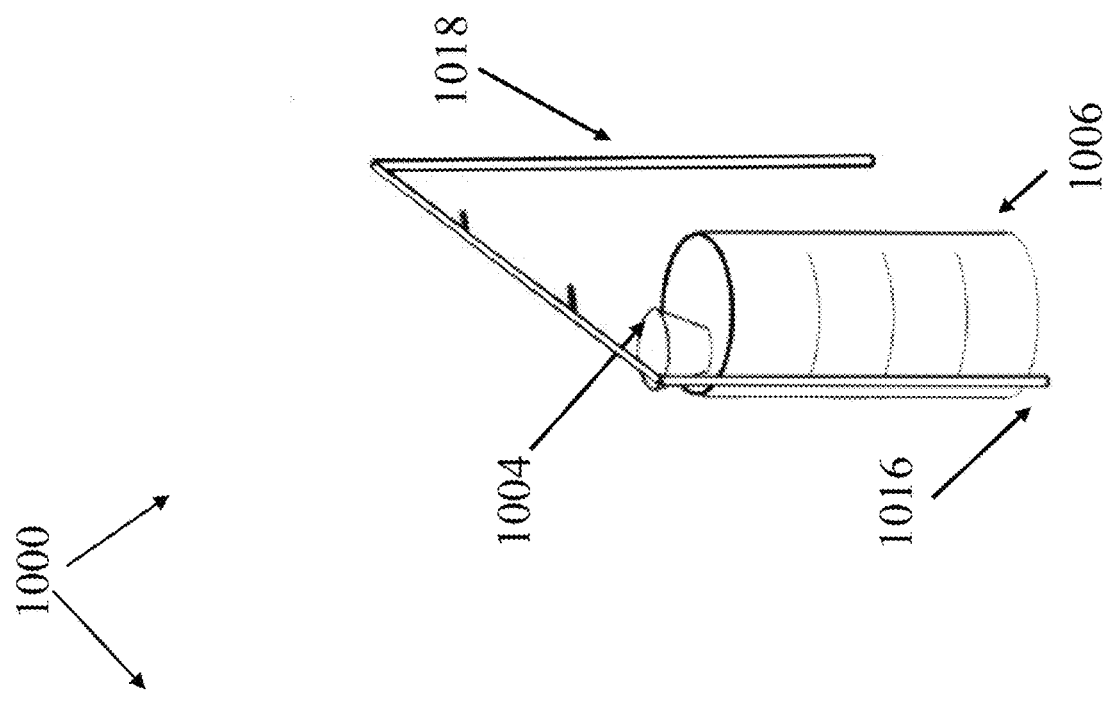
FIG. 1B shows a perspective view of a second part of the rainwater collection embodiment set shown in FIG. 1A.
Figure 1A:
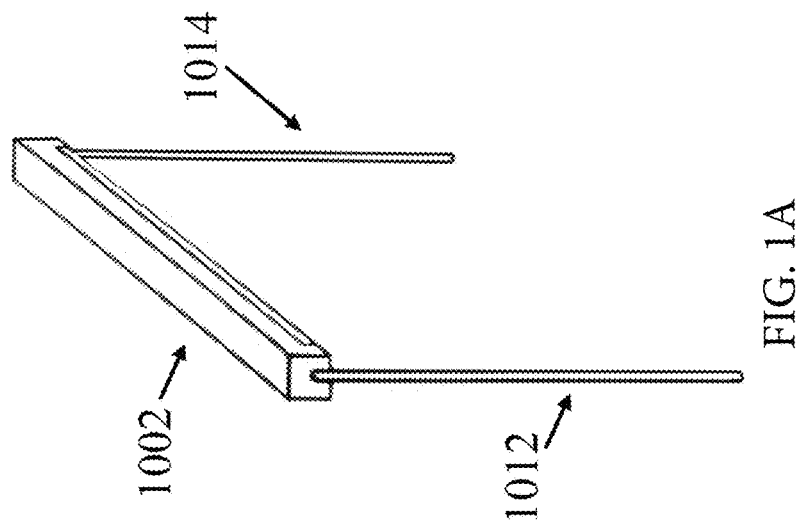
FIG. 1A shows a perspective view of one part of a rainwater collection embodiment set.

In FIG. 1A and FIG. 1B, a rainwater collection system or set 1000 is illustrated. The set has housing 1002 supported by structural support 1012 and 1014. The set also may include two more structural supports 1016 and 1018, or the housing may be attached to a structure or other way to hold the housing above ground level. Next to structural supports 1016 and 1018 is the guidance tube 1004. The guidance tube 1004 leads rainwater to reservoir 1006.

In FIG. 2A, the collection surface, such as fabric 1001, is partially drawn out from the housing 1002. The fabric 1001 has a leading edge 2000. On the fabric 1001 at a second edge 3001, there are fixtures 2001. At the leading edge 2000, there are two holes 2002 and 2004. On the other side and in-between structural supports 1016 and 1018, a connection structure 2010 has two hooks 2008 and 2006, shown in FIG. 2B.

Figure 3:
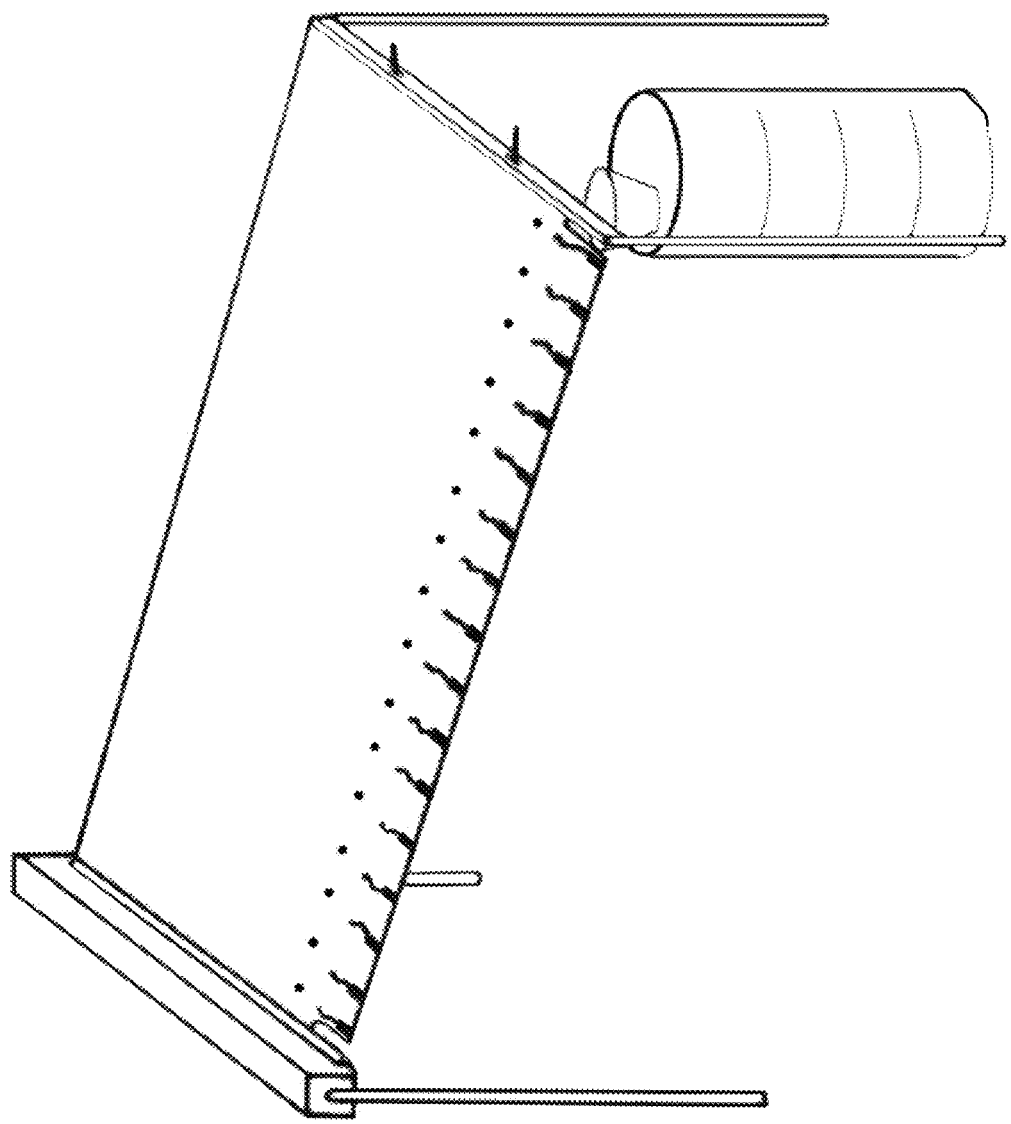
FIG. 3 shows a perspective view of a rainwater collection device when the collection surface is fully drawn out.

In FIG. 3, the collection surface 1001 is fully drawn out of the housing 1002. The holes 2002 and 2004 are attached to the hooks 2010 and 2008, respectively. However, other means to attach or couple the collection surface to a support are possible.

Figure 4:
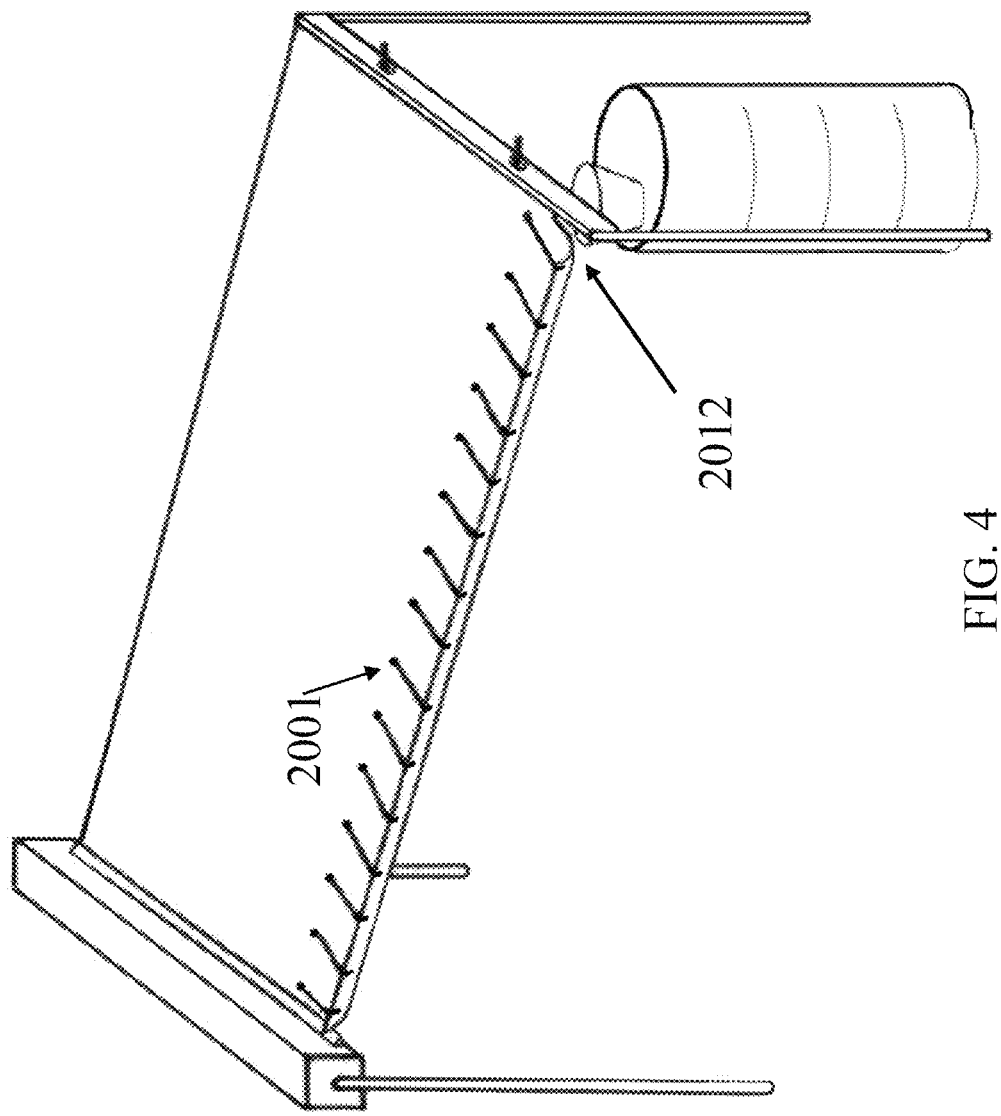
FIG. 4 shows a perspective view of a rainwater collection device when the collection surface is drawn out and a gutter is formed on the surface.

In FIG. 4, the fixtures 2001 close and form a gutter 2012. The gutter 2012 is flexed, for example curvilinearly, to form a diversion channel for collected water to run towards a collection vessel or other end point. Thus, a deployed state is formed when the fixture(s) are configured to form a channel or gutter that diverts water flow to a collection point. Conversely, the collection surface becomes flatter and so is foldable or rollable when the fixture(s) are released such that the channel or gutter is in a non-deployed state.

Figure 5:
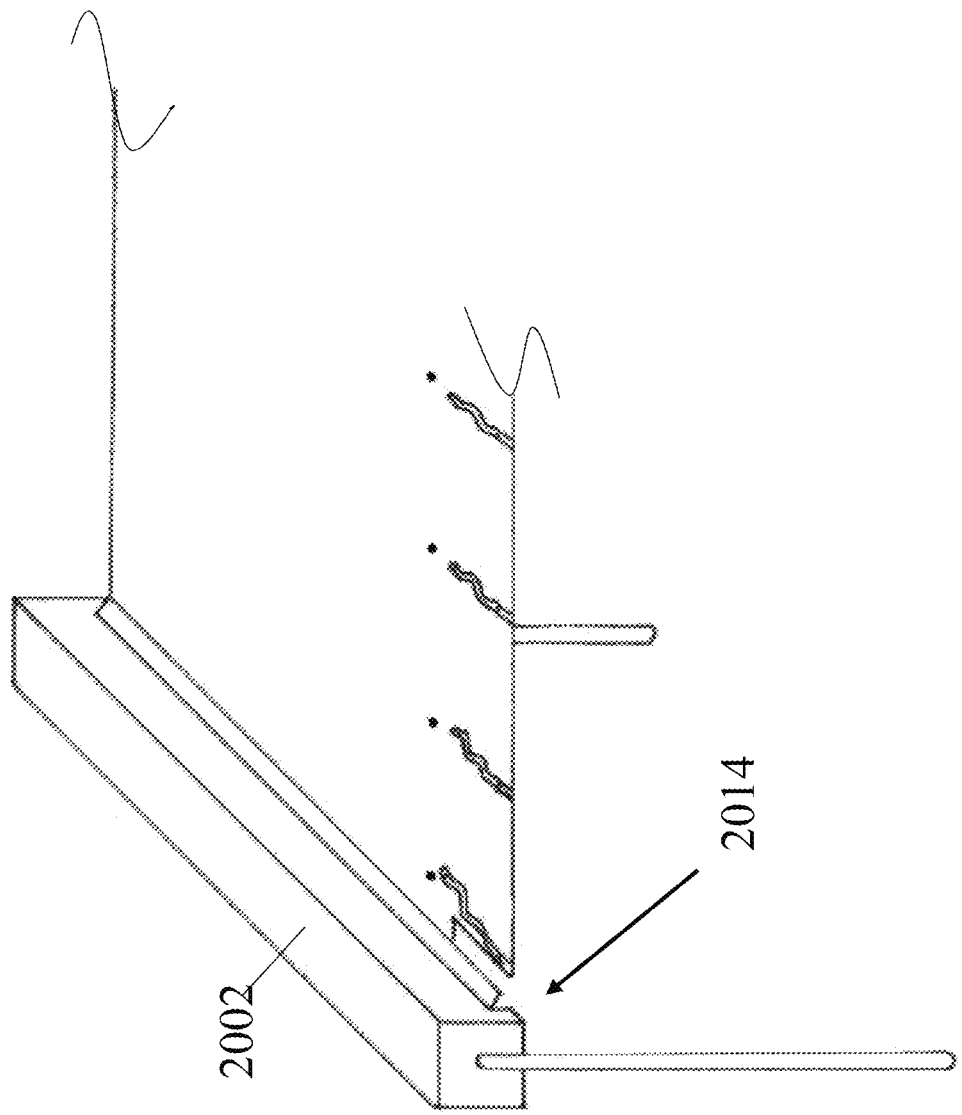
FIG. 5 shows a closer view of the interaction between the housing and the collection surface.
Figure 6:
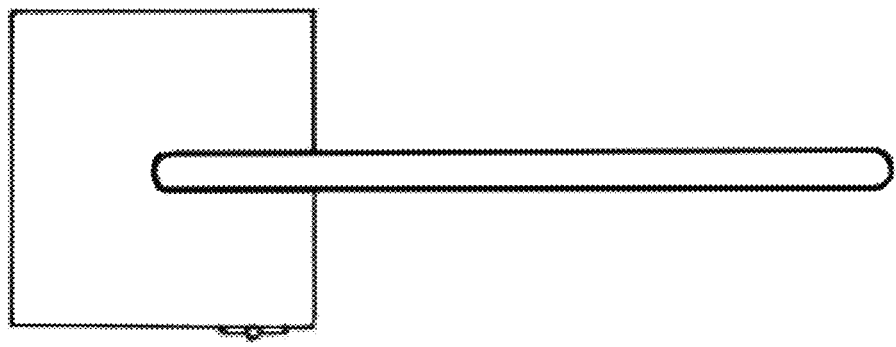
FIG. 6 shows a side view of the housing attached to structural support.

In FIG. 5, the housing 1002 has an opening 2014 that allows the collection surface 1001 to be drawn out. While in FIG. 6, the housing 1002 is shown in side view attached to a structural support.

Figure 7:
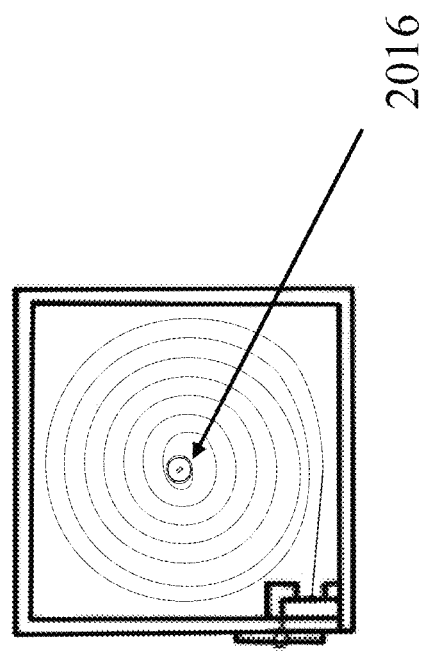
FIG. 7 shows a transparent view of the housing with the collection surface stored inside.

In FIG. 7, the center of the housing 1002 has a spring roller mechanism 2016 (such as those used with roller blinds) that fixes the rolled up collection surface 1001 within the housing. When the surface 1001 is drawn out, the spring roller mechanism 2016 keeps tension on the collection surface 1001, causing a tendency of surface 1001 to be retracted back into the housing 1002 unless it is fixed in place in the drawn-out configuration.

Figure 8:
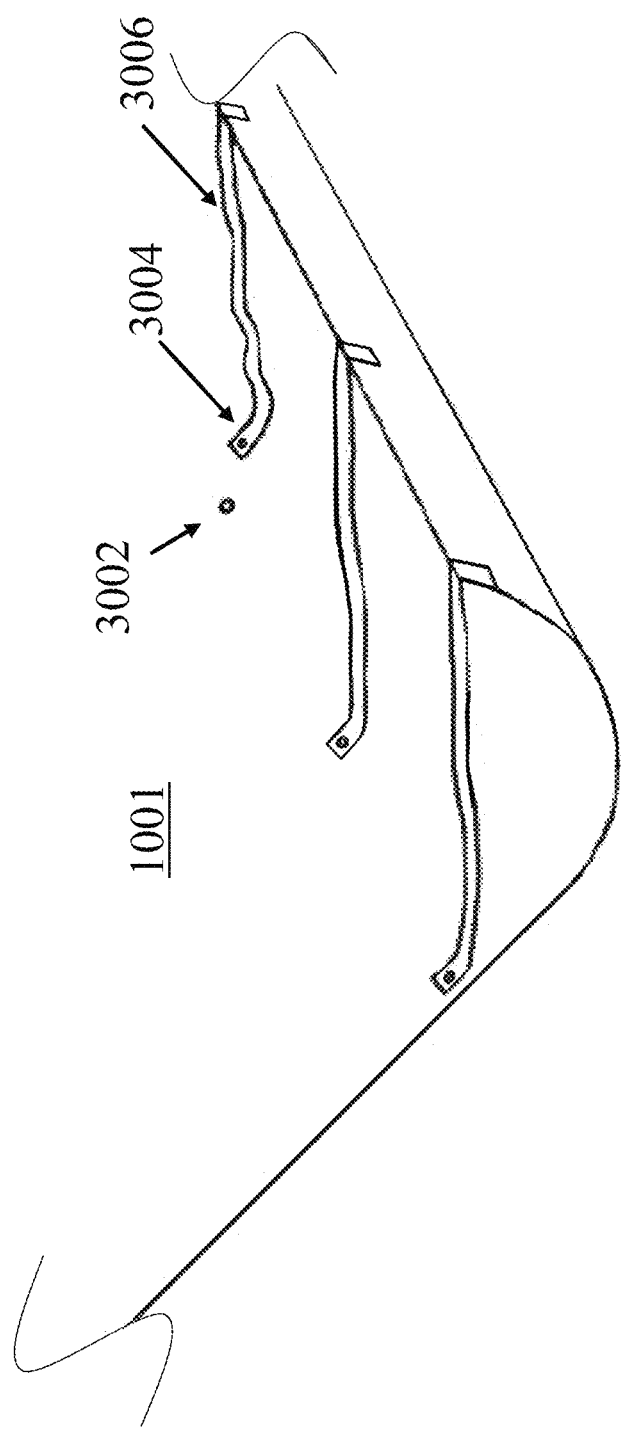
FIG. 8 shows a perspective view of snap fasteners as fixtures on the collection surface.

In FIG. 8, the fixtures can be snap fasteners. One set of snaps contains a button 3002 and a mating button 3004. The button 3002 is attached to the collection surface 1001. The mating button 3004 is attached to a strip 3006. The strip 3006 is attached to the leading edge 2000. When buttons 3002 and 3004 snap close, the fabric 1001 forms a gutter 2012.

Figure 9:
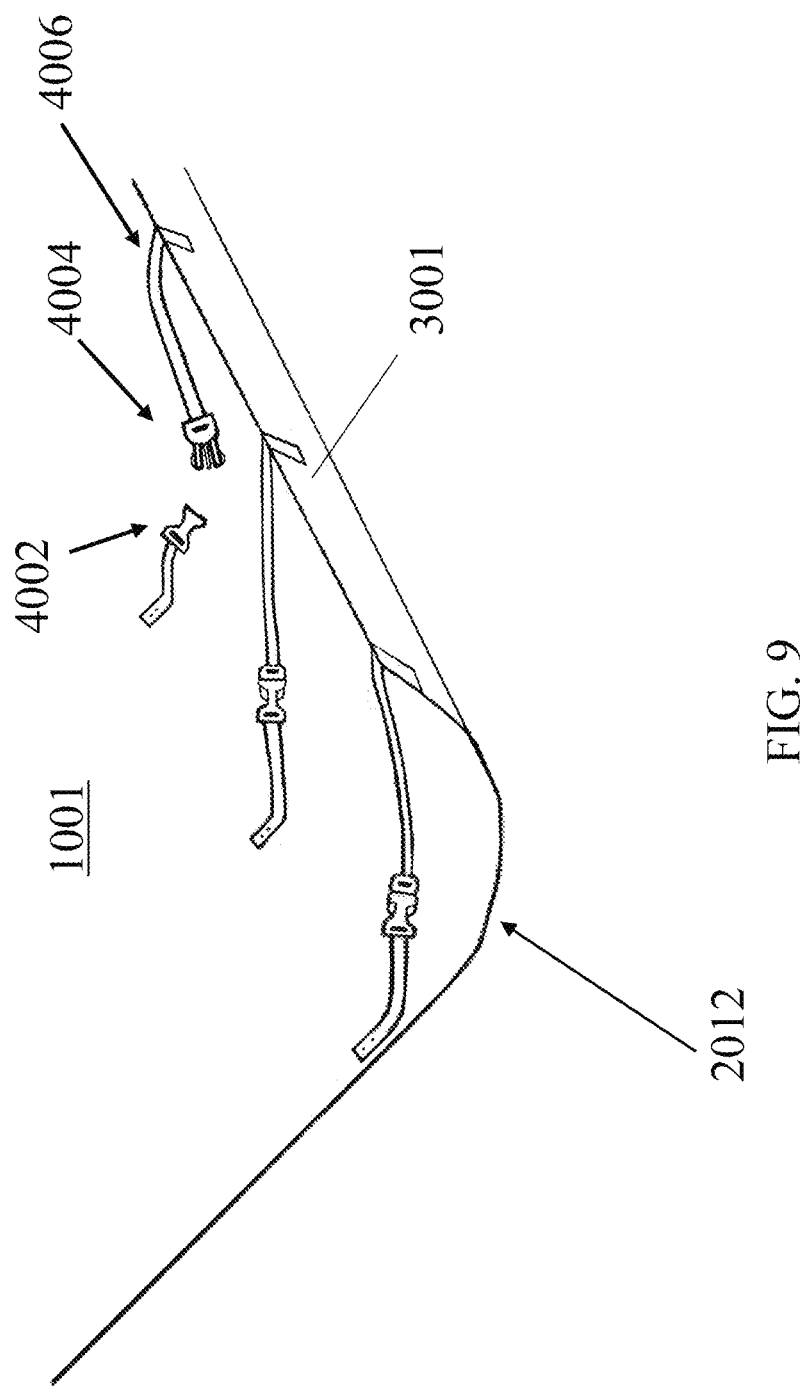
FIG. 9 shows a perspective view of buckle-type fasteners as fixtures on the collection surface.

In FIG. 9, the fixtures can be buckle-type fasteners. One set contains a buckle 4002 and a mating buckle 4004. The buckle 4002 is attached to the collection surface 1001. The mating buckle 4004 is attached to a strip 4006. The strip 4006 is attached to a second edge 3001. When buckles 4002 and 4004 close, the collection surface 1001 forms a gutter 2012.

Figure 10:
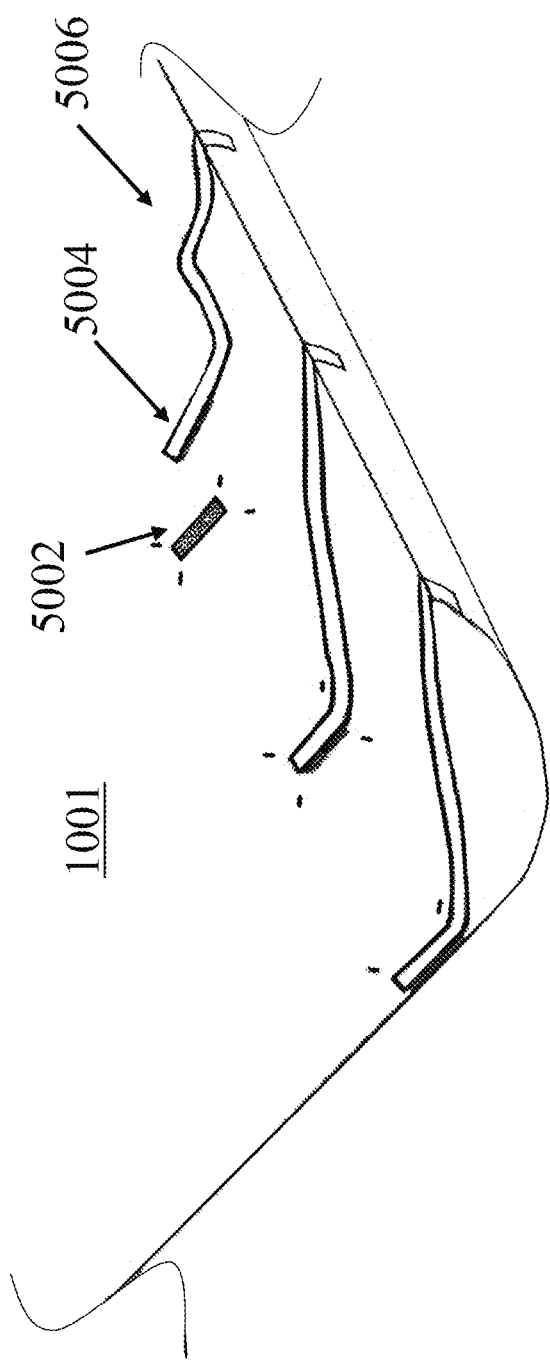
FIG. 10 shows a perspective view of hook and loop tapes as fixtures on the collection surface.

In FIG. 10, the fixtures can hook and loop tapes 5000. One set contains a hook tape 5002 and a loop tape 5004. The hook tape 5002 is attached to the collection surface 1001. The loop tape 5004 is attached to strip 5006. When the hook 5002 and loop 5004 tapes are attached to each other, the collection surface 1001 forms a gutter as in other embodiments.

Figure 11:
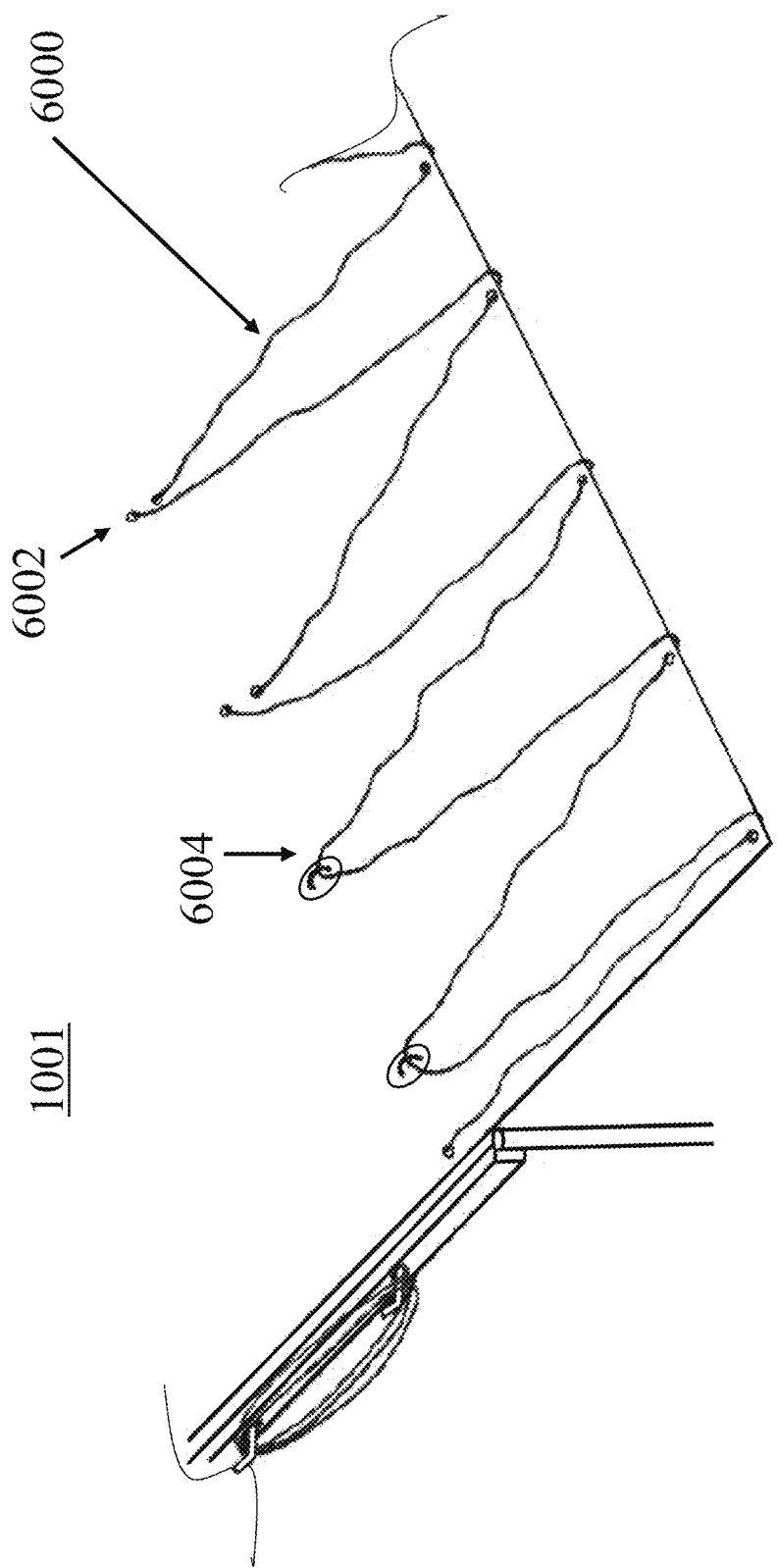
FIG. 11 shows a perspective view of wiring as a fixture on the collection surface.
Figure 12:
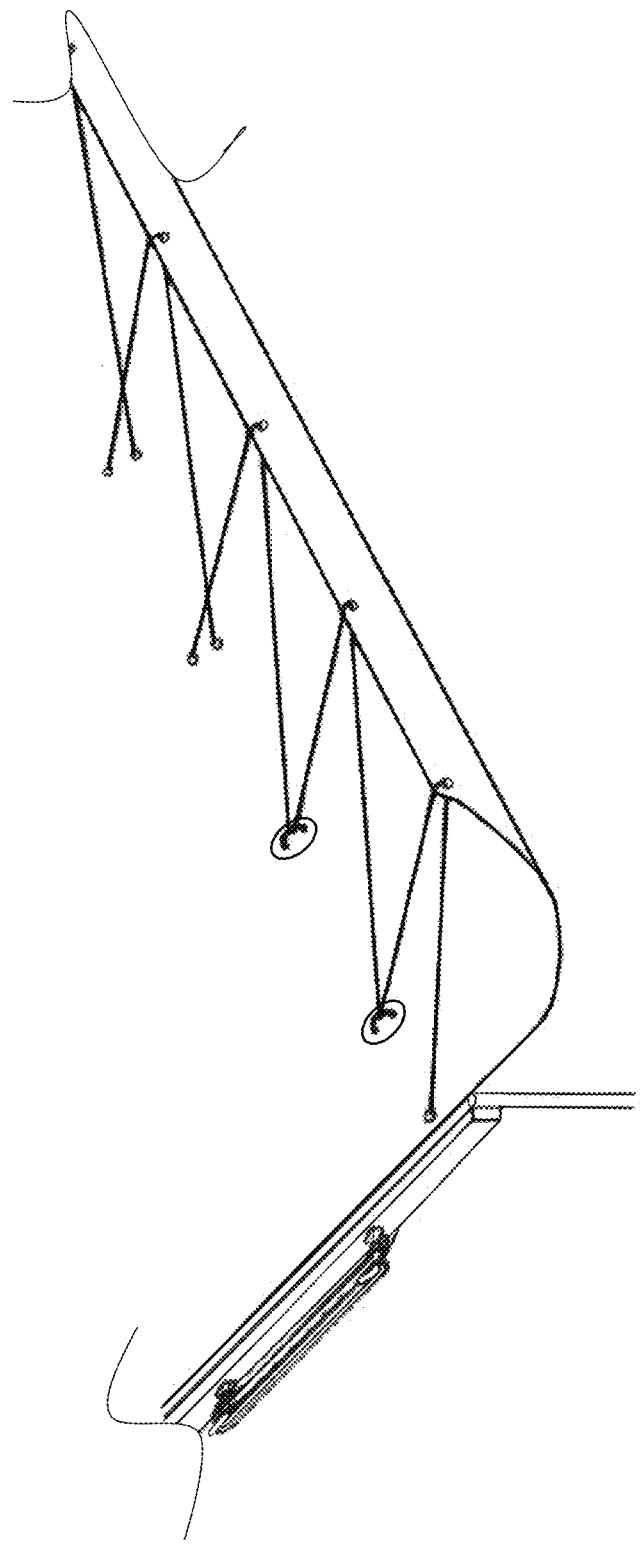
FIG. 12 shows a perspective view of the wiring tightens and forming a gutter on the collection surface.

In FIG. 11, the fixtures can be a filament, for example, rope or wires 6000. On the collection surface 1001, at some distance from the edges, holes 6002 can be formed in the surface itself. Opening 6004 can also be formed by a loop that is attached to the fabric. To form a gutter, the wires 6000 can be pulled from a free end (not shown) to cause the collection surface edge to curve (as seen in FIG. 12, where the wires go through the holes and are tightened such that the gutter 2012 forms).

Figure 13:
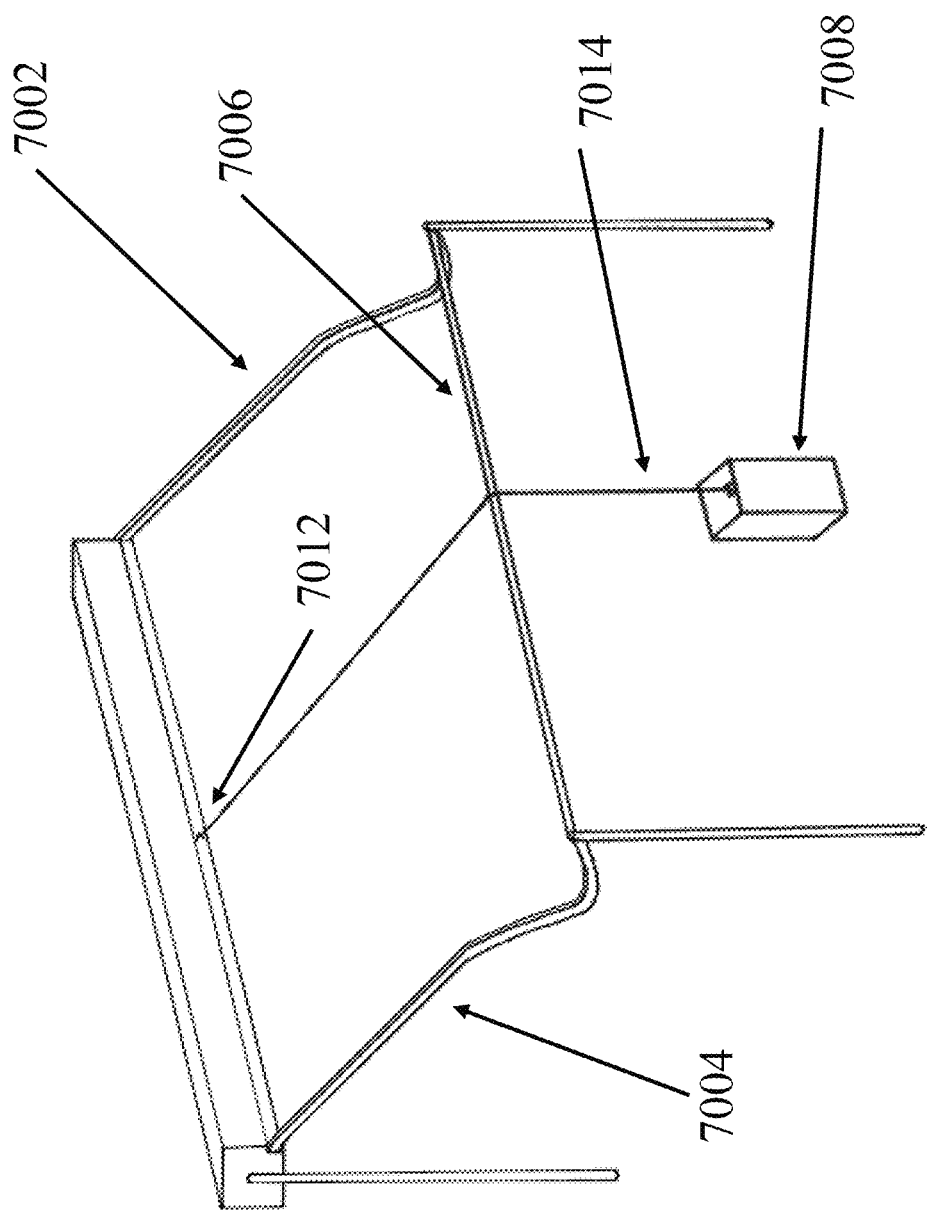
FIG. 13 depicts an embodiment having side railings attached to the structural supports and a motor or spring mechanism having a string for drawing the collection surface out of the housing.
Figure 14:
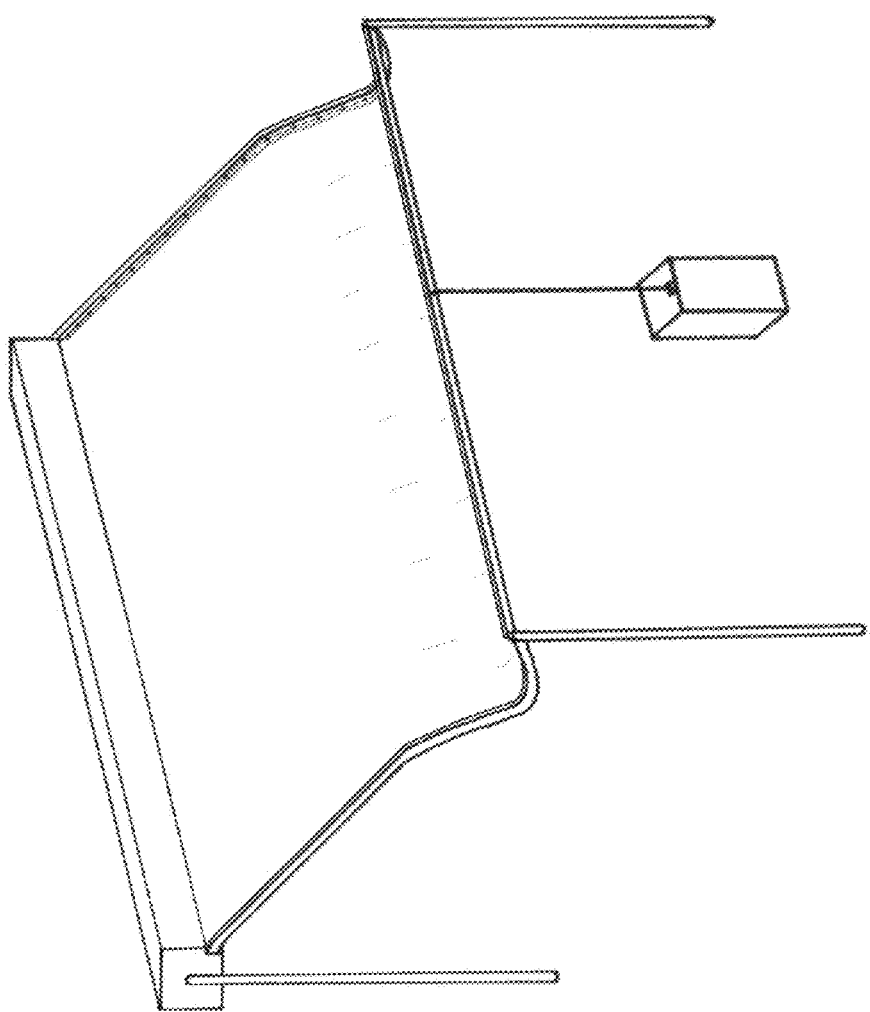
FIG. 14 depicts the embodiment shown in FIG. 13 with the collection surface fully drawn out of the housing.

In FIG. 13, the left railing 7004 is attached to the housing and supported by the structural supports as in other embodiments. The right railing 7002 is attached to the housing and supported by the structural supports as in other embodiments. The motor or spring (e.g., a hand crank) mechanism 7008 is connected to line or string 7014, and the string 7014 is connected to the collection surface (rolled inside the housing) edge 7012. The string 7014 is supported by a guidance support 7006. Thus, as seen in FIG. 14, the motor or spring mechanism 7008 operates to create tension on string 7014, causing the fabric 1001 to extend along the railings 7004 and 7002, forming a gutter at the curved end portions of the railings.

What is claimed is:

1. An apparatus for collecting rainwater, comprising:
one or more structural supports;
a rainwater collection surface, wherein the surface has at least an edge portion that is flexible and configured to form a channel or gutter that diverts water flow to a collection point;
a housing configured to enclose the collection surface; and
a roller spring disposed within the housing.

2. The apparatus in claim 1, further comprising one or more fixtures, wherein the fixtures are coupled to the collection surface and when engaged are configured to form a gutter or channel along an edge of the collection surface.

3. The apparatus in claim 1, further comprising at least one rail configured to form a channel or gutter along an edge of the collection surface.

4. The apparatus in claim 3, further comprising a guidance support.

5. The apparatus in claim 4, further comprising a motor or spring mechanism and a line, wherein the line is configured to provide tension at an edge of the collection surface when the motor or spring mechanism is engaged.

6. The apparatus in claim 2, wherein the one or more fixtures comprise one or more of snaps, buckles, hook-and-loop fasteners, and openings.

7. The apparatus in claim 1, further comprising a collection vessel disposed proximally to an end of the channel or gutter.

8. An apparatus for collecting rainwater, comprising:
one or more structural supports;
a rainwater collection surface, wherein the surface has at least an edge portion that is flexible and configured to form a channel or gutter that diverts water flow to a collection point when the channel or gutter is in a deployed state, and wherein the surface is foldable or rollable when the channel or gutter is in a non-deployed state;
a housing configured to enclose the collection surface; and
a roller spring disposed within the housing.

9. The apparatus in claim 8, further comprising one or more fixtures, wherein the fixtures are coupled to the collection surface and when engaged are configured to form a gutter or channel along an edge of the collection surface.

10. The apparatus in claim 9, wherein the one or more fixtures comprise one or more of snaps, buckles, hook-and-loop fasteners, and openings.

11. The apparatus in claim 8, further comprising a collection vessel disposed proximally to an end of the channel or gutter.

* * * * *